United States Patent [19]

Hopper

[11] Patent Number: 5,707,072
[45] Date of Patent: Jan. 13, 1998

[54] RECEIVER HITCH SYSTEM FOR ALL-TERRAIN SPORT VEHICLES

[76] Inventor: Dennis D. Hopper, 1300 Dallas Dr., No. 1011, Denton, Tex. 76205

[21] Appl. No.: 549,973

[22] Filed: Oct. 30, 1995

[51] Int. Cl.⁶ .................................................. B60D 1/52
[52] U.S. Cl. .................... 280/491.5; 280/461.1; 280/500; 280/503; 224/521
[58] Field of Search ............ 280/456.1, 461.1, 280/491.1, 491.5, 495, 496, 497, 500, 502, 503; 224/511, 518, 519, 520, 521, 401

[56] References Cited

U.S. PATENT DOCUMENTS

| | | | |
|---|---|---|---|
| 3,431,005 | 3/1969 | Priefert | 280/491.5 X |
| 4,072,257 | 2/1978 | Hall | 224/521 X |
| 4,438,945 | 3/1984 | Curtis | 280/491.5 X |
| 5,219,105 | 6/1993 | Kravitz | 224/521 X |
| 5,458,389 | 10/1995 | Young | 224/521 X |
| 5,593,139 | 1/1997 | Julian | 224/521 X |

*Primary Examiner*—Kevin Hurley
*Attorney, Agent, or Firm*—Jerry C. Ray

[57] ABSTRACT

A receiver hitch system for all-terrain sport vehicles includes a rigid mast assembly attaching to a two-point receiver hitch at the rear of the vehicle. A lower receiver hitch is attached to a non-suspended axle of the ATV, and an upper receiver hitch attaches to a suspended frame of the ATV, so that the rear suspension cannot operate, and loads on the mast assembly are borne directly by the axles and wheels. Lifting masts with booms, hunting platforms, and cargo boxes may be supported by the mast assembly.

8 Claims, 3 Drawing Sheets

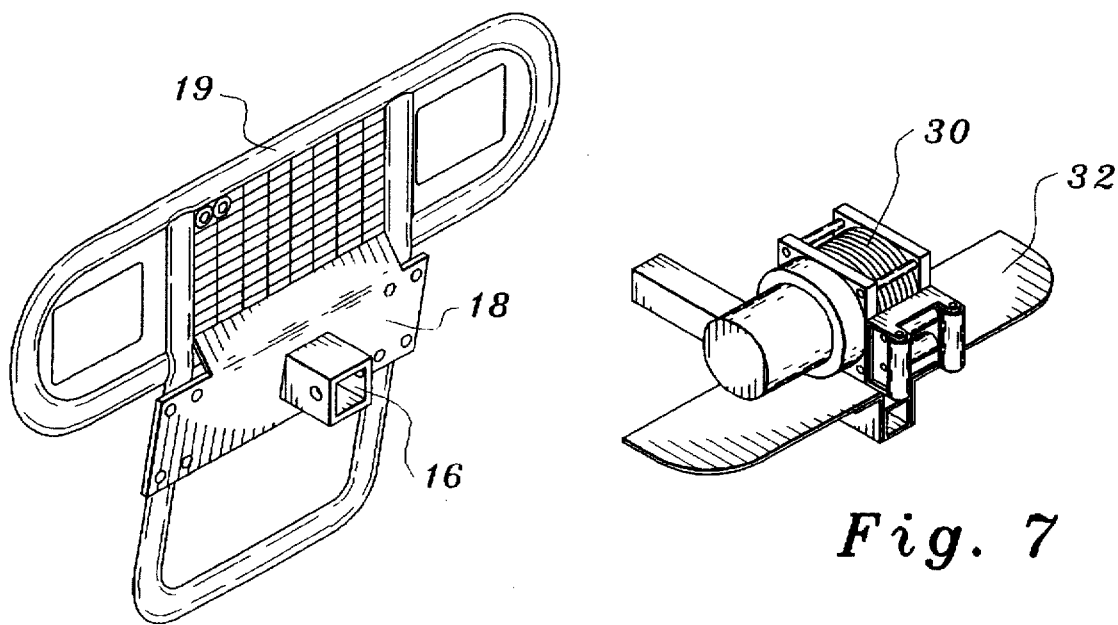
Fig. 6
Fig. 7
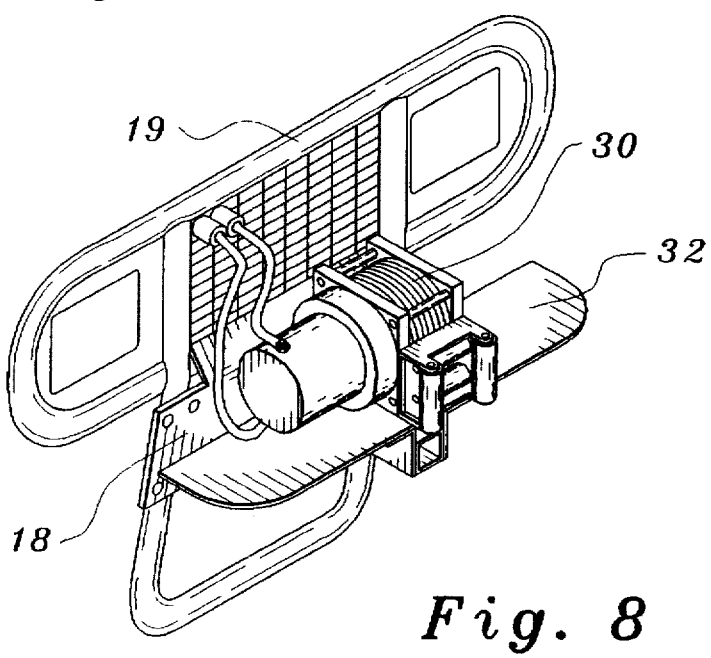
Fig. 8

RECEIVER HITCH SYSTEM FOR ALL-TERRAIN SPORT VEHICLES

BACKGROUND OF THE INVENTION:

1. Field of the Invention

This invention relates to systems for mounting winches and other equipment on all-terrain sport vehicles, and particularly to receiver hitch systems which lock out the suspension of such vehicles.

2. Description of the Related Art

The popularity of all-terrain sport vehicles has been growing for more than a decade. In addition to recreational riding, the versatile vehicles are used by hunters to reach areas remote from any road, and by farmers and ranchers as a substitute for horses. In each of these uses, ATVs are able to cover large distances over rough terrain.

Users of ATVs frequently need to pull or to carry some type of load on the vehicles. This is somewhat difficult due to the limited capacity of ATVs, and because the typical cargo area is a rack mounted behind the driver's seat. The cargo rack is rather high off the ground, requiring cargo to be lifted into place, at the risk of strained muscles and possible back injury. In addition, the weight of loads on an ATV cargo rack is added to the weight of the driver, increasing the load on the suspension of the vehicle.

A need exists, therefore, for an apparatus increasing the capacity of ATVs to carry and/or pull loads.

In the related art, Webb (U.S. Pat. No. 5,072,962) discloses a load-bearing winch installed on a drawbar which can be mounted on either the front or rear of a vehicle. Swayze et at. (U.S. Pat. No. 5,054,745) disclose an ATV winch comprising a split reel which mounts onto an axle of the ATV so that the rotation of the axle turns the reel, which acts as a winch to move the ATV. Neither of these inventions, or any other known to Applicant, solves the problem of carrying loads on an ATV as described herein.

A pre-examination search disclosed the following U.S. Patents, listed for the Examiner's consideration:

| U.S. Pat. No. | Issue Date | Patentee |
| --- | --- | --- |
| 3,941,324 | Mar. 2, 1976 | Green |
| 4,148,445 | Apr. 10, 1979 | Reynolds et al. |
| 5,096,102 | Mar. 17, 1992 | Tolson |
| 5,054,745 | Oct. 8, 1991 | Swayze et al. |
| 5,072,962 | Dec. 17, 1991 | Webb |
| 5,169,042 | Dec. 8, 1992 | Ching |

SUMMARY OF THE INVENTION:

The invention allows ATVs to carry useful loads. Farmers and ranchers can carry fence posts, bales of hay, and other supplies; hunters can transport game or firewood. In addition, a winch can be mounted in either of three positions on the ATV.

A mast assembly has a mounting arm and a mounting bracket which attach to a two-point hitch on the rear of the ATV. The two-point hitch comprises a lower receiver hitch and an upper receiver hitch. The lower part of the mast, to which the mounting arm and the mounting bracket are welded, forms a rigid link between the hitch points on the ATV. Because the mounting arm of the mast assembly is attached to the non-suspended undercarriage of the ATV, and the mounting bracket on the mast assembly is attached to the suspended frame of the vehicle, the suspension is locked out or prevented from operating. This feature allows considerable loads to be borne by the mast assembly, because the loads are transmitted directly through the wheels to the ground, and do not compress the suspension system.

Accessories attachable to the mast assembly include a mast extension with adjustable boom, hunting platforms supported by a mast extension, and cargo containers, both open and closed.

OBJECT OF THIS INVENTION

It is an object of this invention to provide a hitch system for carrying loads on all-terrain vehicles, suitable for use by farmers, ranchers, hunters, and other outdoorsmen.

It is a further object of this invention to provide a receiver hitch system having a mounting that locks out the suspension of an ATV, so the load is borne directly on the axles of the ATV.

It is a further object of this invention to provide a hitch system which can support a mast for lifting and hauling objects by an ATV.

Another object is to increase the versatility and usefulness of an ATV winch by allowing the winch to be mounted either on the front or the rear of an ATV, and to be moveable from one position to the other.

Further objects are to achieve the above with devices that are sturdy, compact, durable, lightweight, simple, safe, versatile, and reliable, yet inexpensive and easy to manufacture, install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS:

FIG. 6 shows a front-mounted hitch on the brush guard of an ATV.

FIG. 7 shows a winch in place on a winch mounting plate.

FIG. 8 shows a winch mounted on a front receiver hitch, with electrical conductors in place.

Figure 1:
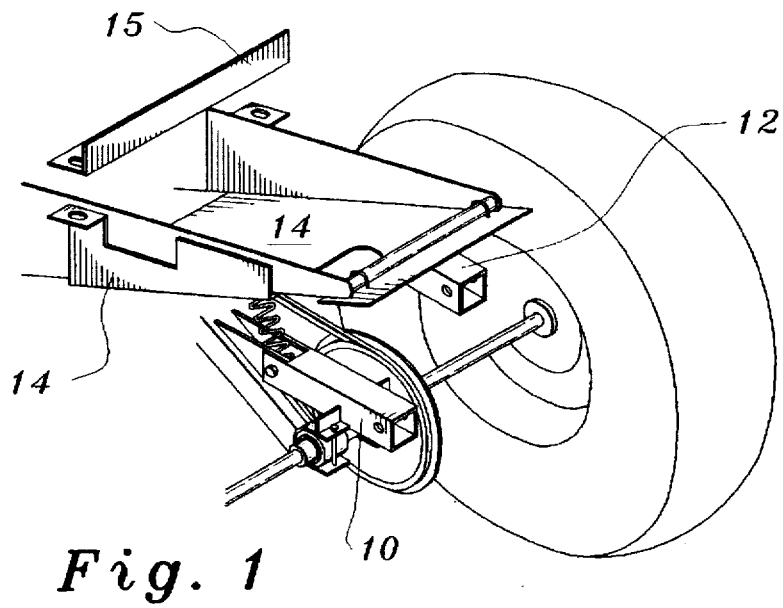
FIG. 1 illustrates the upper and lower hitches mounted on the rear of an ATV.

CATALOG OF THE ELEMENTS:

To aid in the correlation of the elements of the invention to the exemplary drawings, the following catalog of the elements is provided:

10 Lower receiver hitch
12 Upper receiver hitch
14 Upper receiver hitch mounting plate
15 Mounting plate member
16 Front receiver hitch
18 Front receiver hitch mounting plate
20 Mast assembly
22 Mast member
24 Mounting arm 26 Mounting bracket
28 Mast receiver hitch
30 Winch
32 Winch mounting plate

DESCRIPTION OF THE PREFERRED EMBODIMENT:

Referring to FIG. 1, a lower receiver hitch 10 is attached to the lower end of the swing arm of the All-Terrain Vehicle (ATV). The swing arm, together with a shock absorber, forms part of the suspension system for the body of the ATV. A hole through the forward end of the receiver hitch 10 receives a bolt which also secures the lower end of the shock absorber. Other points of attachment for the lower receiver hitch 10 are bolts attached to the mounting where the swing arm is attached to the rear axle. Because the rear receiver hitch is mounted on the rear axle, i.e., on the non-suspended part of the vehicle, a load on the first receiver hitch does not compress the suspension system.

Figure 2:
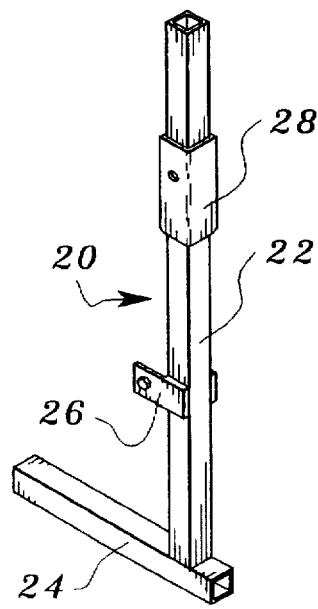
FIG. 2 shows the mast assembly with mounting member and mounting bracket.

Referring now to FIG. 2, a mast assembly 20 includes a mast member 22, to which are attached a mounting arm 24 and a mounting bracket 26. These three components are integral, joined together by welding or by other means. Square steel tubing is used to fabricate the mast assembly; other structural materials may also be used.

The mounting arm 24 has dimensions to fit closely into the receiver hitch 10. A hole through the lower arm matches a hole through the receiver hitch, allowing a locking pin to be inserted through both hitch 10 and mounting arm 24, locking the mast assembly into place in the hitch. When in place in the receiver hitch, the lower mounting arm is substantially horizontal, while the mast itself rises at an angle from the vertical, angling away from the rear of the ATV.

As shown in FIG. 1, an upper receiver hitch 12 is attached to the suspended frame of the ATV, above the lower receiver hitch. The upper receiver hitch is welded to a receiver hitch plate 14, which is shaped to conform to the frame of the ATV. Another part of the upper receiver hitch mounting is a mounting plate member 15, shown in FIGS. 1 and 3, which is mounted above the frame structure. Mounting plate member 15, which may be a length of angle iron, is disposed above the rear-extending frame members of the ATV. Threaded bolts connect the mounting plate 14 and the mounting plate member 15 to clap the mounting plate securely to the frame members of the ATV. Additional points of attachment are provided by a cylindrical member connecting the two rear ends of the frame members; U-bolts around the cylindrical member are bolted to the mounting plate 14.

Because the rear frame members of the ATV are typically at an angle, i.e., rising upwards toward the rear of the vehicle, the upper receiver hitch 12 is welded to the plate 14 at an angle so that the hitch is horizontal or nearly so. The angle of receiver hitch to mounting plate is shown in FIG. 4.

Figure 3:
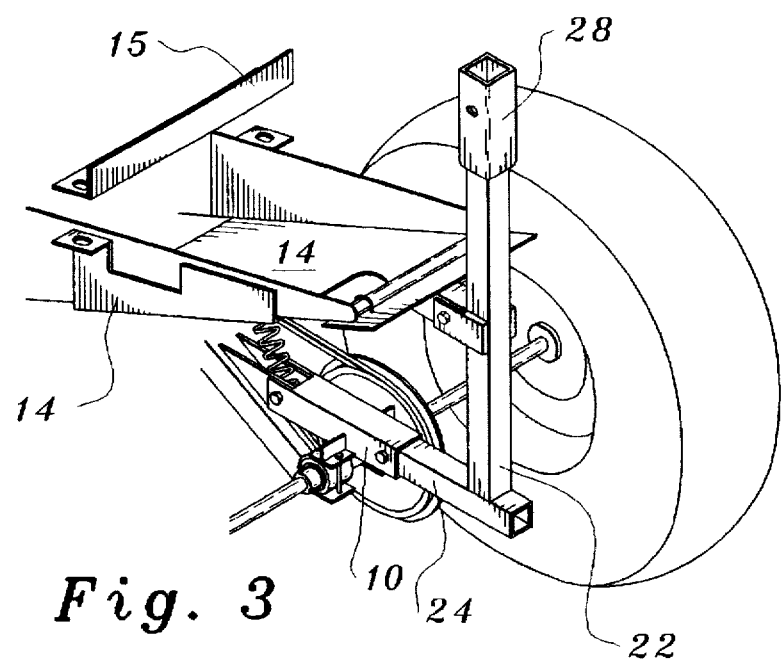
FIG. 3 shows the mast assembly in place on the ATV.
Figure 4:
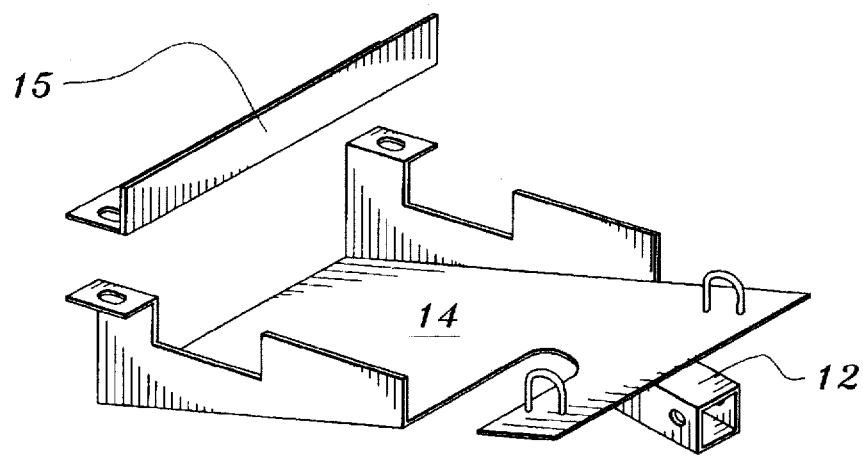
FIG. 4 is a perspective view of the mounting plate for the upper receiver hitch.
Figure 5:
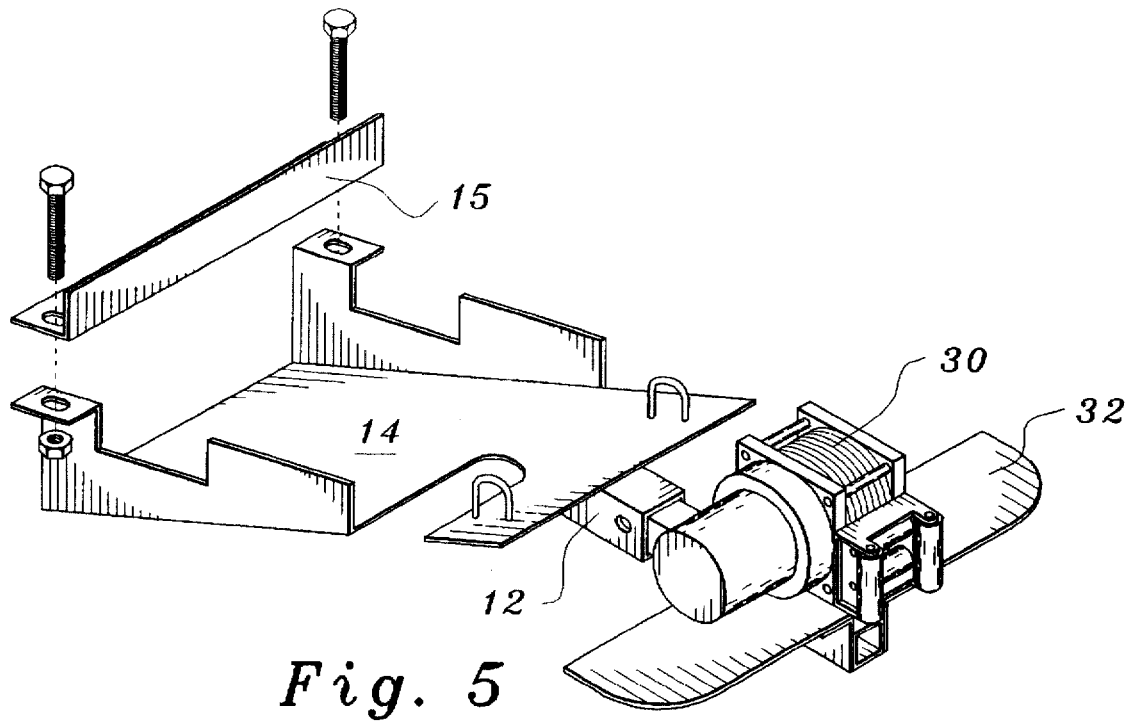
FIG. 5 shows an electric winch in place in the upper receiver hitch.

Referring to FIGS. 3 and 4, a mounting bracket 26 on the mast assembly 20 comprises one or more metal plates, which fit on the outside of the upper receiver hitch. A locking pin inserted through matching holes in the mounting bracket 26 and the upper receiver hitch 12 keeps the two securely in engagement.

The mounting bracket and the mounting arm are welded to the lower portion of the mast member 22 to form a rigid structure. With the mast assembly in place on the vehicle, the mast forms a rigid unit joining the non-suspended axle assembly and the suspended frame of the ATV, so that the suspension is effectively disabled, or prevented from being compressed. Thus a load on the mast assembly 20 is borne primarily by the rear axle whence it is transmitted to the wheels, so that the suspension spring and shock absorber are not compressed by the load.

At the top of the mast assembly 20, the upper end of the mast member 22 terminates in a mast receiver hitch 28 to accept accessories for the ATV. Accessories include a lifting mast having an electric winch 30, with an adjustable boom at the top of the mast. A hand-cranked winch may be used in place of the electric winch. Other accessories are: cargo containers including open boxes for hauling firewood, etc., and also including closed boxes for hauling hunting dogs and the like; a hunting platform mounted on a vertical extension of the mast; and others.

Referring to FIG. 6, another component of the invention is a front receiver hitch 16, which is welded to a front receiver hitch mounting plate 18. The front hitch mounting plate 18 is attached by brackets to the brush-guard 19 on the front of the ATV. The brush-guard is made of heavy metal tubing, and is attached to the vehicle's frame. A winch 30 such as shown in FIG. 7 is mounted in the front receiver hitch 16, resulting in a configuration shown in FIG. 8.

A winch 30 may be mounted in any of three configurations: in the front receiver hitch, in the rear upper receiver hitch, or on a mast extension mounted on the rear mast assembly. Where the winch is electric, connections for electrical power (12v DC) are provided at the front and rear of the ATV. FIG. 8 shows an electric winch in place on the front hitch with electrical conductors plugged in.

It is understood that the front suspension of the ATV is not locked out or disabled, and that loads borne by the front receiver hitch are carried by the suspended body of the machine. This of course reduces the effective load that may be carried by the front hitch.

Where an extension mast and boom are the accessory attached to the mast assembly, the boom may be positioned so that the load is suspended close to the ATV. This reduces the torque which would tend to raise the from of the ATV, and allows considerable loads to be carried without causing the ATV to tip or to affect the steering. The inventor has found that on an ATV made by the Polaris Company, loads of 250 pounds and more can be safely carried.

The embodiments shown and described above are only exemplary. I do not claim to have invented all the parts, elements, or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. A receiver hitch system for an all-terrain sport vehicle (ATV), comprising:

a) a two-point hitch at a rear end of the ATV, b) said two-point hitch including a lower receiver hitch attached to a non-suspended undercarriage of the ATV and an upper receiver hitch attached to a suspended frame of the ATV, c) means for linking said lower receiver hitch and said upper receiver hitch to form a rigid structure to prevent operation of a vehicular suspension of the ATV, and d) a front receiver hitch attached to a front end of the ATV.

2. The invention as described in claim 1, wherein:

e) said lower receiver hitch attaches to a swing-arm mounting at a rear axle of the ATV, said swing-arm being part of the vehicle suspension, and f) said upper receiver hitch includes a mounting plate attached to a suspended frame of the ATV.

3. The invention as described in claim 1, wherein:

g) said means for linking is a mast assembly removably attached to said two-point hitch at a rear end of the ATV.

4. The invention as described in claim 3, wherein:

h) said mast assembly is a rigid structure including a mast member, a mounting arm, and a mounting bracket, said mounting member for attaching to said lower receiver hitch and said mounting bracket for attaching to said upper receiver hitch, and i) an upper end of said mast assembly having means for receiving cargo-carrying accessories.

5. The invention as described in claim 4, wherein:

j) said means for receiving cargo-carrying accessories includes at an upper end of said mast member a receiver hitch for attaching accessories to said mast assembly.

6. The invention as described in claim 1, wherein:

k) said front receiver hitch is mounted on a plate attached to a brush guard at the front of said ATV.

7. A receiver hitch system for an all-terrain sport vehicle (ATV) for use of an interchangeable winch at either end of the ATV, comprising:

a) a rear receiver hitch attached to a rear end of the ATV, b) a front receiver hitch attached to a front end of the ATV, and c) said rear receiver hitch is attached to a non-suspended undercarriage of the ATV.

8. The invention as described in claim 7, wherein:

d) said front receiver hitch is attached to a brush guard at the front end of the ATV.

\* \* \* \* \*